May 5, 1959 J. M. MORRIS 2,885,067
VIBRATORY CONVEYOR SPRING ASSEMBLY
Filed June 13, 1957 2 Sheets-Sheet 1
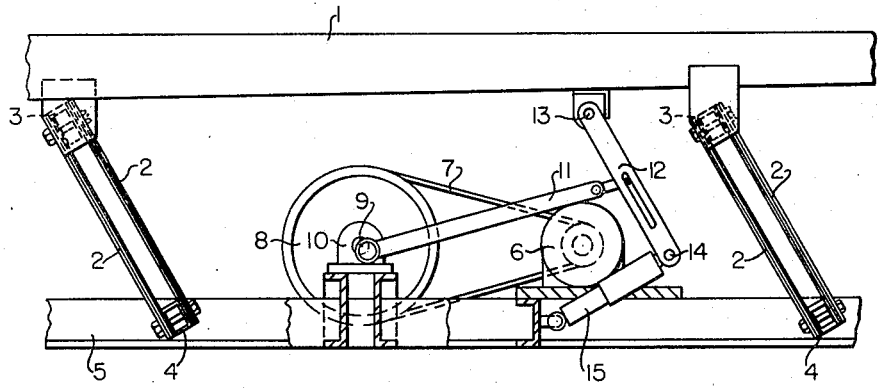
Fig. I
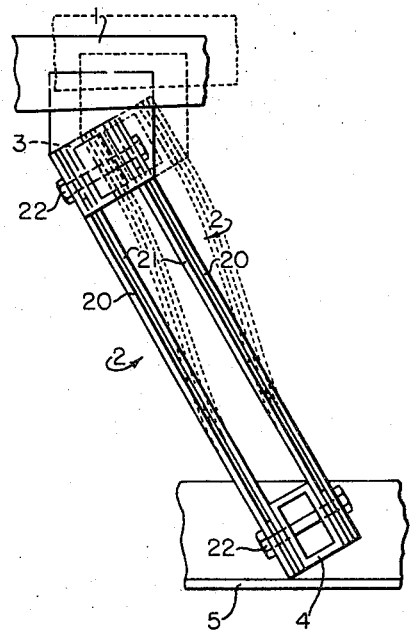
Fig. II
INVENTOR.
JOHN M. MORRIS
BY
Marshall, Marshall & Yeasting
ATTORNEYS May 5, 1959  J. M. MORRIS  2,885,067
VIBRATORY CONVEYOR SPRING ASSEMBLY
Filed June 13, 1957  2 Sheets-Sheet 2
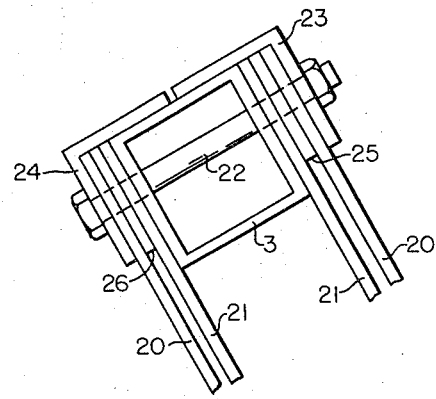
_Fig. III_
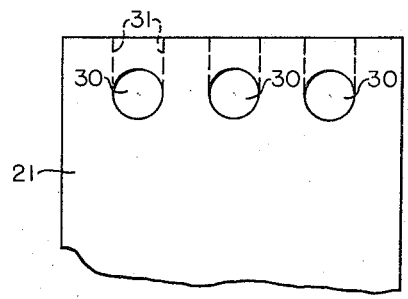
_Fig. IV_
INVENTOR.
JOHN M. MORRIS
BY
Marshall, Marshall & Gasting
ATTORNEYS United States Patent Office 2,885,067
Patented May 5, 1959

2,885,067

VIBRATORY CONVEYOR SPRING ASSEMBLY

John M. Morris, Louisville, Ky., assignor to Carrier Conveyor Corporation, Louisville, Ky., a corporation of Kentucky Application June 13, 1957, Serial No. 665,397

5 Claims. (Cl. 198—220)

This invention relates to vibratory conveyors and more particularly to an improved spring arrangement for supporting a vibratory conveyor from its base or exciter member.

One of the difficult problems in the design of vibratory conveyors is to find suitable material for the springs that are used to support the vibratory conveyor. Particularly in large size vibratory equipment the supporting springs are subjected to high repetitive stresses that soon cause fatigue failures in most types of spring materials. Thus, for example, spring steel when used as leaf springs in supporting a conveyor must not be stressed over 25 or 30,000 lbs. per square inch in the extreme fibers of the springs or premature failure of the springs is almost certain to occur. In contrast, the same steel spring material when subjected to uniform stress can carry as much as 150,000 lbs. per square inch before failing.

The principal object of this invention is to provide improved springs for vibratory conveyors such springs consisting of pairs of leaf springs constructed of different materials some of which materials are extremely strong in shear and others have high fatigue strength for resisting repetitive bending stress.

Another object of the invention is to provide an improved spring arrangement in which spring materials subject to fatigue are stressed well below their fatigue limits while other materials not sensitive to fatigue failure are employed to withstand the principal bending stresses occurring in the springs as they are used in a vibratory conveyor.

Another object of the invention is to provide an improved spring arrangement for a vibratory conveyor in which a plurality of springs of different materials are employed, each spring being adapted to sustain the forces for which it is particularly well suited.

These and other objects and advantages are attained in a spring structure constructed according to the invention.

According to the invention the spring structure for a vibratory conveyor is constructed of a plurality of pairs of leaf springs. Each of the pairs consists of the parallel combination of a thin steel leaf spring adapted to act as a tension member to prevent longitudinal separation of the parts joined by the spring and a leaf spring constructed of a great plurality of longitudinally extending high strength fibers embedded in a hard resin adhesive. The high strength fiber spring functioning as a cantilever provides the endurance to resist repetitive bending and serves as a highly stressed resilient member in the vibratory system.

A preferred form of the invention is illustrated in the accompanying drawings.

In the drawings:

Figure I is a fragmentary side elevation of a vibratory conveyor employing springs constructed according to the invention.

Figure II is a greatly enlarged fragmentary section of a set of springs showing the springs in both unstressed and deflected positions.

Figure III is an enlarged fragmentary detail showing the connection of the springs to the anchorage members that are attached to the conveyor and its base.

Figure IV is an enlarged fragmentary view of one end of one of the high strength fiber reinforced plastic springs illustrating a common type of failure experienced with such springs in the absence of the cooperating high shear strength steel springs employed in each pair of springs.

These specific figures and the accompanying description are intended merely to illustrate the invention and not to impose limitations on its scope.

A vibrating conveyor employing springs constructed and arranged according to the invention may include a conveyor deck 1 that is supported on a plurality of pairs of parallel leaf springs 2 attached to rectangular tube anchors 3 and 4 secured to the conveyor bed 1 and to a base 5. The springs 2 are arranged in an oblique direction so that, acting as links, they define an inclined path of vibration for the conveyor deck 1 and, acting as guided cantilever springs, they provide the resilient members of a vibratory system that has a natural frequency substantially equal to the operating frequency of the conveyor.

Vibration is produced in the vibrating conveyor 1 by a motor 6 that is connected through a belt 7 to a pulley 8 mounted on a crank shaft 9 that is supported in bearing blocks 10 mounted on the base 5. The crank shaft 9 is connected through a connecting link or connecting rod 11 to a drive lever 12 one end of which is connected through a pivot 13 to the conveyor deck 1 and the other end of which is connected through a pivot 14 and shock absorber 15 to the base 5.

The stiffness of the spring combinations 2, the weight of the conveyor deck 1, and the speed of operation of the motor 6 is such that the conveyor is operated at its natural frequency as determined by the weight of the conveyor deck 1 and the spring rate of the springs 2. As the motor is first started from rest the fixed amplitude of movement of the connecting rod 11 results in a small movement of the conveyor deck 1 and a correspondingly large movement of the pivot 14 as permitted by the shock absorber 15. As the speed increases the resistance of the shock absorber 15 also increases so that a greater proportion of the force is applied to the conveyor deck 1. When the operating speed is reached and resonance occurs the conveyor deck 1 moves easily since its inertia forces are balanced throughout the cycle by the spring force from the springs 2 so that the connecting rod 11 and lever 12 provide only the small force required to overcome the energy losses and maintain the vibration. In this normal operation at resonance the shock absorber 15 has practically no relative movement between its ends and the pivot 14 is substantially stationary in space. This operation is very efficient in that practically no force is transmitted through the connecting rod 11 that does not serve to overcome frictional losses in the system.

The inertia force of the conveyor deck 1, which is the principal force to be considered when it is vibrating at its normal amplitude of vibration, is supplied entirely by the springs 2 and thus these springs are stressed, in large types of equipment, to very high values.

Vibratory conveyors are often used in high temperature processing systems and are required to operate without break through zones of different and varying temperatures. When the conveyor deck and frame are continuous through such zones of different temperature thermal stresses are set up and the supporting springs 2 are stressed, some in tension and some in compression, depending upon the thermal expansion characteristics of the deck. This makes it necessary that the combination of springs 2 be designed to withstand tensile or compression forces parallel to their length as well as the bending force produced by the vibratory motion of the conveyor.

Each of the spring assemblies 2 comprises a parallel arrangement of a thin steel leaf spring 20 and a glass fiber reinforced plastic spring 21. Each of the glass fiber reinforced plastic springs 21 is a flat plate-like assembly of parallel longitudinally extending glass fiber filaments embedded in a suitable hardened adhesive such as an epoxy resin. The individual glass fibers are positioned parallel to each other and parallel to the length of the spring and together comprise approximately 65% of the total volume of the spring. The springs are clamped at each end to the anchors 3 and 4 by means of a plurality of bolts 22 that pass through L-shaped angle clamping brackets or retainers 23 and 24, through holes in the ends of the springs 20 and 21 and through spacer plates 25 and 26 that serve to hold the steel and glass fiber springs in spaced relation. A sufficient number of the bolts 22 are used along the length of the square tubular anchor 3 or 4 so as to maintain continuous clamping pressure between the clamps 23 and the opposing sides of the tubular anchor member 3.

Figure IV shows one end of the glass fiber springs 21 and shows a number of holes 30 through which the bolts 22 pass. One common type of failure that occurred when the glass fiber springs were used alone, that is without the parallel steel springs 20, was failure in shear from the sides of the holes 30 to the end of the spring. These failures occurred along the dotted lines 31 indicating a weakness of the glass fiber reinforced plastic in shear in the direction of the glass fibers. The structure in such a glass fiber spring is somewhat similar to the grain structure in wood in that it exhibits high strength in tension and compression along the grain and high strength in shear perpendicular to the grain but relatively low strength in shear parallel to the grain. Similarly, the glass fiber reinforced plastic spring is subject to splitting parallel to the fibers and this is the type of failure that occurs from the bolt holes 30 to the end of the spring when the spring is subjected to severe tensile stresses parallel to its length. As long as the clamps 23 and 24 are held tight by the bolts 22 sufficient pressure is maintained on the portion of the glass fiber spring between the holes so that rupturing stresses are not applied through the bolts to the glass fiber material between the bolt hole and the end of the spring. Thus when the clamps are tight the system can stand more stress than if the clamps are slightly loosened. However, the addition of the steel springs 20 positioned in parallel with the glass fiber springs 21 serves to add substantial strength in tension so that the glass fiber springs are never stressed in tension to the point of failure in shear or splitting from the bolt holes to the ends of the spring.

In this arrangement the thickness of the spring steel springs 20 is made sufficiently small so that at the normal working amplitudes of vibration the stress in the extreme fibers of the steel springs as a result of the bending is well below the fatigue stress limit. Likewise, the thickness of the glass fiber reinforced plastic spring is made as thick as possible and still stay within the fatigue limit strength of glass fiber at the required deflections. The ratio of fatigue limit stress to modulus of elasticity is much higher for the glass fiber reinforced plastic than the corresponding ratio for steel. This is believed to be due to the fact that a glass fiber reinforced plastic spring depends for its strength on the individual glass fibers and that a notch or other molecular fracture in the surface of one of the glass fibers does not start a crack or break that progresses from the affected fiber throughout the whole mass of fibers. Rather, there may be failure of a few defective fibers scattered throughout the mass of fibers but the result is not a progressive failure as is the start of a small surface crack in a steel spring which on repeated stress gradually grows in size and penetration until finally failure of the whole spring occurs.

The particular combination of a steel spring arranged in spaced parallel relation to a glass fiber reinforced plastic spring and the pairs of such springs arranged in parallel spaced relation in their attachment to the tubular anchors provides a parallelogram type of structure in which each of the springs acts as a guided cantilever so that on deflection of one end of the spring relative to the other only one of the anchor members 3 or 4 need be strong in torsion to absorb the twisting stress. Thus, if the base anchor is strong in torsion so as to definitely position the adjacent ends of the springs the springs acting as parallelogram links cause the upper anchor 3, attached to the conveyor, to move in translation only and without any tendency to rotate. In a practical structure, however, part of the torsion stress is supplied from the base 5 and part from the conveyor bed 1. As a result of inaccuracies in construction or assembly there is usually a substantial tension or compression force present in each of the leaf springs. The steel springs positioned laterally outside the glass fiber reinforced plastic springs in each combination of two pair of springs carry the tension or compression forces required to prevent rotation of one of the anchors with respect to the other or the stresses resulting from thermal changes or other sources. Thus, these steel members take the tension or compression stress and relieve the relatively weaker glass fiber springs from such stresses which would tend to split out the end connections.

In this combination of steel springs in parallel with glass fiber springs the glass fiber reinforced plastic springs which are very strong as far as distributed tension and compression forces in the extreme fibers are concerned are well adapted to withstand the bending stresses occasioned by the relative movement between the conveyor and its base.

While parallel longitudinally extending glass fibers embedded in a hardened resin adhesive are preferred, other types of fibers embedded in resin may be substituted without losing the advantages of parallel springs of differing materials. Among the materials having great resistance to fatigue failure are wood fibers impregnated with phenolic resin and cured under heat and pressure to make a relatively dense strong material. The grain of the wood, constituting the fibers are generally parallel to each other and the length of the member. This material is known commercially as "Pregwood." Several commercial products composed of linen or cotton cloth or threads impregnated with resin, assembled with the strong threads or fibers parallel to each other, and cured under heat and pressure have characteristics suitable for use as vibrator springs. The essential characteristic in each of these materials is the fact that the individual fibers are more or less isolated from each other so that failure of one fiber or thread does not overload the next adjacent fiber or thread and thus promote progressive failure of the article. In contrast a fine crack or notch in a steel spring causes a minute area of stress concentration and further failure of the material.

One of the desirable properties realized by these springs and by the glass fiber reinforced plastic springs in particular is the high ratio of strength to modulus of elasticity possessed by the fibers. Thus in the glass fibers, the tensile stress that may be safely employed in a vibratory system may be in the order of 25 to 29,000 lbs. per square inch while the modulus of elasticity is 4.4 to 5 million lbs. per square inch. This is a ratio of strength to modulus of about $6 \times 10^{-3}$. The corresponding ratio for spring steel, for example, is $1.6 \times 10^{-3}$, or approximately one-fourth the ratio obtained for the glass fiber reinforced plastic material.

The glass fiber springs perform very well in this system because, in addition to their high ratio of fatigue strength to modulus of elasticity, they also have comparatively high strength so as to be able to store large amounts of energy in the springs during the extreme deflections in the cycle of vibration. This property is expressed as the modulus of resilience.

A good vanadium steel has a modulus of resilience of about 250 while a unidirectional glass fiber laminate material has a modulus of resilience of over 600 representing about two and a half times the energy storage capacity of the steel springs. When they are compared on the basis of weight the comparison is still more in favor of the glass fiber spring.

The combination in each of the parallel pairs of springs of a steel spring to absorb tension or compression stresses applied through the clamping bolts and the parallel fiber reinforced plastic spring provides a combination that has long life in a vibratory conveyor, is easy to manufacture and install, and is relatively impervious to ordinary ambient conditions under which the system must operate.

Various modifications in the details of the combination of springs in the assembly may be made without departing from the spirit or scope of the invention or losing the advantages attained by the combination of the steel and fiber reinforced plastic springs arranged in cooperative relation in sustaining the various spring loads imposed by a vibratory conveyor.

Having described the invention, I claim:

1. In a device for doing work by vibration comprising a first elongated member adapted to perform work by vibration and a second member serving as a support therefor, in combination, a plurality of pairs of leaf springs arranged in spaced parallel relation to each other and connecting said members, each of said pairs of springs comprising a first spring composed of a material having a high shear and tensile strength and a second spring in non-contacting closely spaced parallel relation to the first spring and composed of a large plurality of longitudinally extending parallel fibers embedded in a resin matrix.

2. In a device for doing work by vibration comprising a first elongated member adapted to perform work by vibration and a second member serving as a support therefor, in combination, a plurality of pairs of leaf springs arranged in spaced parallel relation to each other and connecting said members, each of said pairs of springs comprising a first spring composed of a material having a high shear and tensile strength and a second spring in non-contacting closely spaced parallel relation to the first spring and composed of a large plurality of longitudinally extending parallel glass fibers embedded in a resin matrix.

3. In a device for doing work by vibration including a work member and a second member that are held in parallel alignment throughout a cycle of vibration, a composite leaf spring anchored to at least one member and connected to the other, said leaf spring comprising a first spring of a substantially isotropic material having high strength in tension and shear and a second spring that is in non-contacting parallel relation to the first spring and that is composed of an anisotropic material comprising parallel fibers of great strength extending along the length of the spring and embedded in a resin adhesive, said second spring displaying great strength in bending, said first spring sustaining principally tension loads along the length of the spring and said second spring sustaining principally bending and compression loads.

4. In a device for doing work by vibration including an elongated work member and a second member to be held in parallel alignment throughout a cycle of vibration, a composite leaf spring anchored to said members and extending generally normal to the direction of relative motion of the members, said composite leaf spring comprising a first spring member of spring steel of small thickness and a second spring member of relatively greater thickness held in closely spaced non-contacting parallel alignment, said second spring member being composed of a great plurality of glass fiber filaments extending parallel to the length of the spring and embedded in a hardened adhesive.

5. A composite leaf spring according to claim 4 in which the second spring member is at least twice as thick as the first spring member.

References Cited in the file of this patent

UNITED STATES PATENTS

| | | |
|---|---|---|
| 2,062,760 | Overstrom | Dec. 1, 1936 |
| 2,689,464 | Wurtz | Sept. 21, 1954 |
| 2,705,070 | Carrier et al. | Mar. 29, 1955 |
| 2,713,415 | Wurzbach | July 19, 1955 |